Dec. 13, 1966      W. E. HUBER      3,290,954
V-BELT AND METHOD OF MANUFACTURE
Filed May 21, 1963
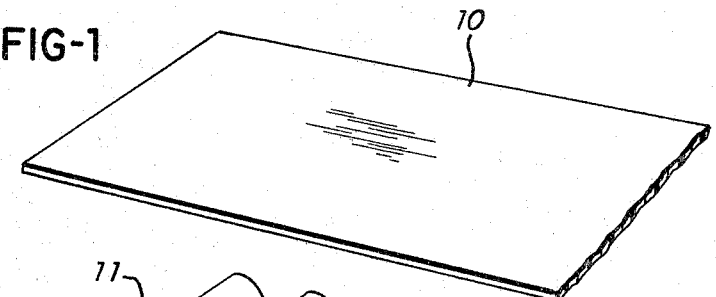
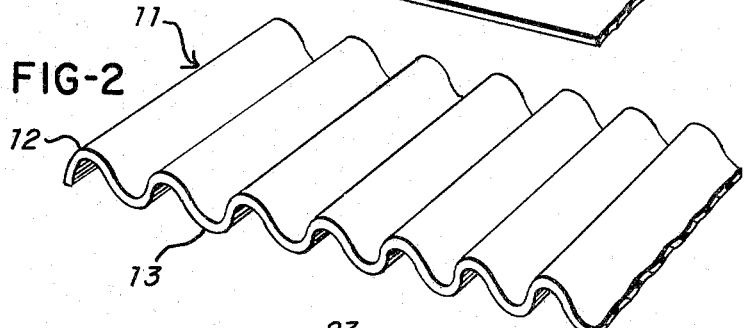
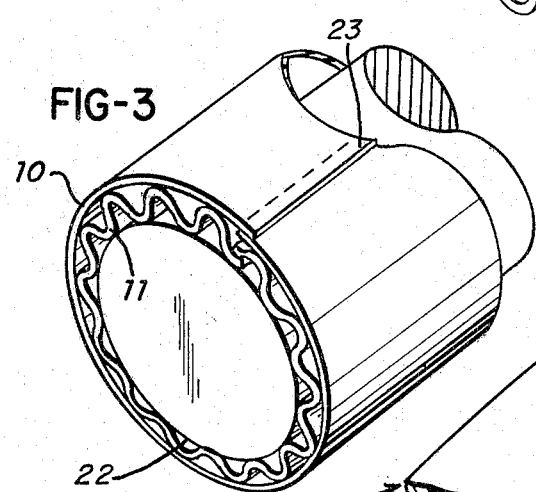
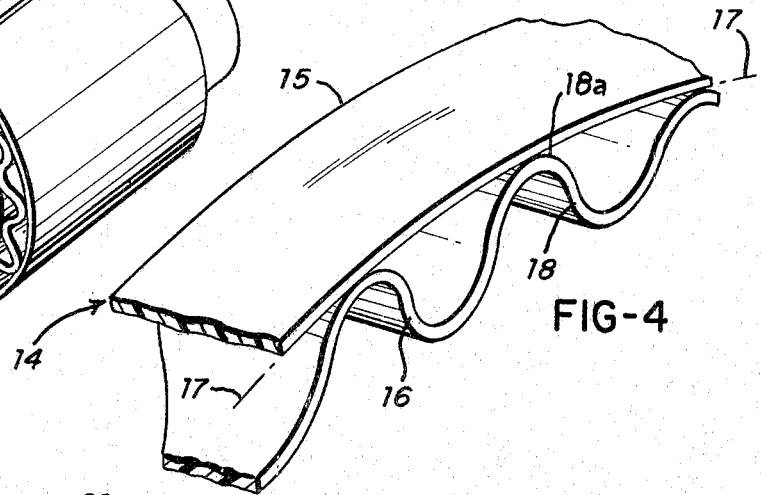
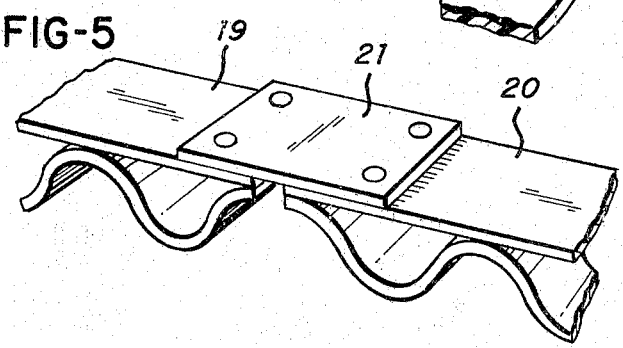
INVENTOR.
WALTER E. HUBER
BY
*Reuben J Wolk*
ATTORNEY

United States Patent Office 3,290,954
Patented Dec. 13, 1966

3,290,954
V-BELT AND METHOD OF MANUFACTURE
Walter E. Huber, Springfield, Mo., assignor to Dayco Corporation, Dayton, Ohio, a corporation of Ohio
Filed May 21, 1963, Ser. No. 281,935
4 Claims. (Cl. 74—233)

This invention relates to a V-type belt and a method of manufacturing same which is simple and yet provides a highly satisfactory product. A conventional V-type belt consists of an outer or tension section; an inner or compression section; and a neutral axis section located between the inner and outer sections. During operation, as the belt passes about the pulleys, the inner section is subjected to compression forces while simultaneously the outer portion is subjected to tension forces. In the conventional belt, all three of these sections are normally formed of rubber and fabric combinations with the tension section including longitudinally extending cords to provide the necessary strength. Such a belt, for example, is illustrated in United States Patent No. 2,783,818, of common assignment.

According to the present invention, an entirely new concept of belt construction and method is involved, in which the tension section is formed of a comparatively thin sheet of rigid plastic material, while the compression section is formed of a sheet of similar plastic material formed in corrugated fashion. These sections are joined together to form the finished belt and the common plane between them defines the neutral axis section, eliminating the need for a separate section.

It is a principal object of the invention to provide a V-type belt which is simple in construction, light in weight and inexpensive.

It is a further object to provide a method for manufacturing such a belt.

These and other objects will be apparent in the following description and drawings, in which:

FIGURE 1 is a perspective view of a portion of the member forming the tension section of the belt, prior to assembly.

FIGURE 2 is a perspective view of a portion of the member forming the compression section of the belt, prior to assembly.

FIGURE 3 is a perspective view of a portion of a belt body assembled on a mandrel.

FIGURE 4 is a perspective view, partly in section, of a portion of a completed belt according to the invention.

FIGURE 5 is a perspective view, partially in section, of a portion of a belt manufactured according to a modified form of the invention.

Turning now to the drawings, the tension section of the belt is illustrated in FIGURE 1 and consists of a rigid, yet flexible, sheet of a plastic material such as oriented nylon, polyethylene, polypropylene, vinyl, or similar material, and is designated as member 10. The compression section is illustrated in FIGURE 2 and is made of material similar to member 10, except that it is formed in corrugated fashion consisting of ridges 12 and valleys 13 therebetween. This is designated as member 11. Both members are preferably cut to size so that the length (transversely of the corrugations) is equal to the circumference of the building mandrel, and the width (along the corrugations) is equal to the length of the mandrel. The members are placed around the mandrel 22 as shown in FIGURE 3, and adhered at the overlapping edge 23. The members may be assembled separately, with member 11 located interiorly of member 10; or, if desired, a sub-assembly of the two members may be made before applying to the mandrel.

The members 10 and 11 are bonded to each other at the common plane of the ridges 12 and the inner surface of the member 10, to form a permanent combination. The overlapped area 23 is then bonded to form a continuous cylindrical member, by any of several means. For example, a heat sealing process may be used on those plastic materials susceptible of heat sealing. Various adhesives and cements, such as heat curable, pressure sensitive, or air curable, may be used. After the cylindrical belt body is formed, an appropriate cutting mechanism is used to separate the body into individual belts of trapezoidal cross section. Such a mechanism is described, for example, in United States Patent No. 2,661,579. The resultant belt 14 is shown in fragmentary perspective in FIGURE 4, and consists of the outer or tension section 15 and the inner or compression section 16. Section 16 has ridges 18a and valleys 18 corresponding to those in the original member 11.

All V-belts in operation pass about pulleys so that the inner section is in compression and the outer section is in tension. The flexing or bending occurs about an intermediate section known as the neutral axis. In the present invention the neutral axis is located at the inner surface of member 15 which is the plane of bond with the outer surface member 14, and is designated in FIGURE 4 as 17—17. It is thus clear that the construction of the belt 14 is necessarily simpler than that of the belt such as shown in United States Patent No. 2,783,818, where the neutral axis must be separately built (section 11). At the same time, the curved, inwardly extending portions of the corrugations between ridges and valleys will help absorb the forces produced during operation.

It should be noted that in addition to the structural advantages of the belt configuration, the shape of the corrugations may permit the belt to be used in a cog type drive, wherein the corrugations mesh with a toothed sprocket. It should also be noted that other modifications of the invention are apparent; for example, instead of a continuous belt, a discontinuous belt, designed for use with a connector, may be built, as shown in FIGURE 5. The belts 19 and 20 are joined by means of a connector 21 in a conventional manner.

The above description relates to specific embodiments of the invention, but it is understood that other modifications within the spirit of the invention are specifically contemplated.

I claim:
1. In a V-belt comprising tension and compression sections, said tension section consisting of a thin sheet member of plastic material, and said compression section consisting of a corrugated member of similar material, the outer corrugated surfaces of said compression section bonded to the inner surface of said tension section, the common plane of the inner surface of the tension section and the outer corrugated surfaces of the compression section defining the neutral axis of said belt.

2. The belt of claim 1 in which said plastic material is oriented nylon.

3. The belt of claim 1 in which said plastic material is polyethylene.

4. The belt of claim 1 in which said plastic material is vinyl.

References Cited by the Examiner

UNITED STATES PATENTS

| | | | |
|---|---|---|---|
| 2,249,514 | 7/1941 | Berg et al. | 74—231 |
| 2,423,579 | 7/1947 | Buren | 74—233 |
| 2,562,166 | 7/1951 | Bendall | 74—233 |
| 2,805,182 | 9/1957 | Hallenbeck | 74—231 |

FOREIGN PATENTS

| | | |
|---|---|---|
| 116,054 | 10/1942 | Australia. |
| 65,134 | 11/1946 | Denmark. |
| 512,763 | 11/1930 | Germany. |
| 782,195 | 9/1957 | Great Britain. |

DAVID J. WILLIAMOWSKY, *Primary Examiner.*

DON A. WAITE, *Examiner.*

J. A. WONG, *Assistant Examiner.*